(12) United States Patent
Sakuraba

(10) Patent No.: US 9,841,936 B2
(45) Date of Patent: Dec. 12, 2017

(54) PRINT SETTING CONTROL PROGRAM AND PRINT SETTING CONTROL METHOD

(71) Applicant: KONICA MINOLTA, INC., Chiyoda-ku, Tokyo (JP)

(72) Inventor: Tamotsu Sakuraba, Sagamihara (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/088,196

(22) Filed: Apr. 1, 2016

(65) Prior Publication Data

US 2016/0306597 A1 Oct. 20, 2016

(30) Foreign Application Priority Data

Apr. 20, 2015 (JP) ................. 2015-085815

(51) Int. Cl.
*G06F 3/12* (2006.01)
*H04N 1/00* (2006.01)

(52) U.S. Cl.
CPC .......... *G06F 3/1255* (2013.01); *G06F 3/1204* (2013.01); *G06F 3/1205* (2013.01);
(Continued)

(58) Field of Classification Search
None
See application file for complete search history.

(56) References Cited

U.S. PATENT DOCUMENTS

2006/0082802 A1* 4/2006 Furuya ................. G06F 3/1206
358/1.13
2009/0268241 A1 10/2009 Choi et al.
(Continued)

FOREIGN PATENT DOCUMENTS

EP 2 757 464 A2 7/2014
JP 2004-005455 1/2004
(Continued)

OTHER PUBLICATIONS

The extended European Search Report dated Sep. 8, 2016 by the European Patent Office in corresponding European Patent Application No. 16164596.5-1957. (8 pages).
Notification of Reasons for Rejection issued in corresponding Japanese Patent Application No. 2015-085815, dated Jun. 2, 2017, with English Translation (11 pages).
(Continued)

Primary Examiner — Thomas D Lee
(74) Attorney, Agent, or Firm — Buchanan Ingersoll & Rooney PC

(57) ABSTRACT

A non-transitory recording medium storing a computer readable print setting control program operated by a device for instructing an image forming apparatus to print, the print setting control program causing the device to function as an information acquisition unit which obtains information on a function performed by the image forming apparatus, a display control unit which causes a display unit to display a print setting screen where the function performed by the image forming apparatus is set, and a prohibition determining unit which determines whether a previous setting conflicts with a following setting and changes the previous setting to a setting which does not conflict with the following setting when the settings conflict with each other, wherein the display control unit decorates displays at set positions of the previous setting and the following setting when the previous setting is changed due to the conflict between the settings.

14 Claims, 15 Drawing Sheets

(52) U.S. Cl.
CPC .......... *G06F 3/1247* (2013.01); *G06F 3/1285* (2013.01); *G06F 3/1287* (2013.01); *H04N 1/00411* (2013.01); *H04N 1/00925* (2013.01); *H04N 2201/0094* (2013.01)

(56) References Cited

U.S. PATENT DOCUMENTS

| | | |
|---|---|---|
| 2010/0257446 A1 | 10/2010 | Woolfe et al. |
| 2012/0069364 A1* | 3/2012 | Kodama ............ G06F 3/04817 358/1.9 |
| 2014/0198343 A1 | 7/2014 | Cho |

FOREIGN PATENT DOCUMENTS

| | | | |
|---|---|---|---|
| JP | 2006-110861 | | 4/2006 |
| JP | 2007-052807 | | 3/2007 |
| JP | 2009-070409 | | 4/2009 |
| JP | 2009-211713 A | | 9/2009 |
| JP | 2010-244317 | | 10/2010 |
| JP | 2010244317 A | * | 10/2010 |
| JP | 2012-123704 | | 6/2012 |
| JP | 2013-107247 | | 6/2013 |

OTHER PUBLICATIONS

Decision of Rejection issued in corresponding Japanese Patent Application No. 2015-085815, dated Aug. 18, 2017, with English Translation (6 pages).

* cited by examiner

FIG. 5

```
40b
┌─ FOLDING ─────────────────────────────────────┐
│ FOLDING            [Z-FOLDING      ▽]         │
│ FOLDING DIRECTION  ⦿ INSIDE    ○ OUTSIDE      │
└───────────────────────────────────────────────┘
  PAPER DISCHARGE TRAY     [DEFAULT      ▽]
  PAPER PASSING DIRECTION  [AUTOMATIC ▽]
  SORT/GROUP               ⦿ SORT (PER UNIT)  ○ GROUP
  PAPER DISCHARGE MODE     ☐ FACE UP     ☐ REVERSE ORDER
```

FIG. 6

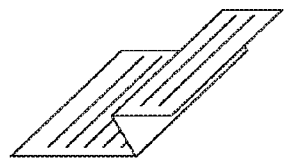

FIG. 7

```
40b
┌─ FOLDING ─────────────────────────────────────┐
│ FOLDING            [OFF            ▽]         │
│ FOLDING DIRECTION  ⦿ INSIDE    ○ OUTSIDE      │
└───────────────────────────────────────────────┘
  PAPER DISCHARGE TRAY     [DEFAULT      ▽]
  PAPER PASSING DIRECTION  [AUTOMATIC ▽]
  SORT/GROUP               ⦿ SORT (PER UNIT)  ○ GROUP
  PAPER DISCHARGE MODE     ☑ FACE UP     ☐ REVERSE ORDER
```

- LAYOUT
  - ☑ DOUBLE SIDE
  - IMPOSITION          [BOOKLET ▽]
  - BINDING DIRECTION   [LEFT BINDING ▽]

- FOLDING
  - FOLDING             [OFF ▽]
  - FOLDING DIRECTION   ⊙ INSIDE    ○ OUTSIDE
- PAPER DISCHARGE TRAY     [DEFAULT ▽]
- PAPER PASSING DIRECTION  [AUTOMATIC ▽]
- SORT/GROUP               ⊙ SORT (PER UNIT)  ○ GROUP
- PAPER DISCHARGE MODE     ☐ FACE UP     ☐ REVERSE ORDER

```
┌ FOLDING ─────────────────────────────────────────────┐
│ FOLDING              [Z-FOLDING    ▽]                │
│ FOLDING DIRECTION    ⦿ INSIDE      ○ OUTSIDE         │
└──────────────────────────────────────────────────────┘
  PAPER DISCHARGE TRAY    [DEFAULT    ▽]
  PAPER PASSING DIRECTION [AUTOMATIC ▽]
  SORT/GROUP              ⦿ SORT (PER UNIT)  ○ GROUP
  PAPER DISCHARGE MODE    □ FACE UP          □ REVERSE ORDER
```

42a points to Z-FOLDING field.

```
┌ FOLDING ─────────────────────────────────────────────┐
│ FOLDING              [i] [OFF       ▽]               │
│ FOLDING DIRECTION        ⦿ INSIDE    ○ OUTSIDE       │
└──────────────────────────────────────────────────────┘
  PAPER DISCHARGE TRAY    [DEFAULT    ▽]
  PAPER PASSING DIRECTION [AUTOMATIC ▽]
  SORT/GROUP              ⦿ SORT (PER UNIT)  ○ GROUP
  PAPER DISCHARGE MODE [i] ☑ FACE UP         □ REVERSE ORDER
```

43 points to the [i] icons; 42a points to OFF field; 42b points to FACE UP.

FOLDING
FOLDING            Z-FOLDING          ▽
FOLDING DIRECTION    ⊙ INSIDE      ○ OUTSIDE

PAPER DISCHARGE TRAY     DEFAULT      ▽
PAPER PASSING DIRECTION  AUTOMATIC  ▽
SORT/GROUP               ⊙ SORT (PER UNIT)  ○ GROUP
PAPER DISCHARGE MODE     □ FACE UP          □ REVERSE ORDER

HIGHLIGHTED DISPLAY
(PREVIOUS SETTING)

FOLDING
FOLDING            OFF              ▽
FOLDING DIRECTION    ⊙ INSIDE      ○ OUTSIDE

PAPER DISCHARGE TRAY     DEFAULT      ▽
PAPER PASSING DIRECTION  AUTOMATIC  ▽
SORT/GROUP               ⊙ SORT (PER UNIT)  ○ GROUP
PAPER DISCHARGE MODE   ☑ FACE UP      □ REVERSE ORDER

HIGHLIGHTED DISPLAY
(FOLLOWING SETTING)

PRINT SETTING CONTROL PROGRAM AND PRINT SETTING CONTROL METHOD

The entire disclosure of Japanese Patent Application No. 2015-085815 filed on Apr. 20, 2015 including description, claims, drawings, and abstract are incorporated herein by reference in its entirety.

BACKGROUND OF THE INVENTION

Field of the Invention

The present invention relates to a print setting control program and a print setting control method, and especially to a print setting control program such as a printer driver for performing processing to prohibition and a print setting control method which can make a setting change to solve the prohibition be easily recognized.

Description of the Related Art

In a case where an instruction to print is issued to a print device such as a printer and a multi-functional peripherals (MFP), after a document has been created by using an application installed to a computer device, data of the document is converted into print data with a page description language (PDL) format by using software (printer driver) to control the print device and is transmitted to the print device. After analyzing the print data and generating intermediate data, the print device forms an image in a bitmap format, and the print device transfers the image to paper and outputs it.

The recent print device includes various functions such as a function which is applied at the time of forming the image (for example, function for summarizing a plurality of pages into a single page) and a function which is applied after the image has been formed (for example, finisher function such as punching and stapling). Some functions are related to each other, and a combination (prohibition) which cannot be set by using related functions exists. When the settings conflict with each other, a current printer driver automatically releases the previous setting.

Regarding a technique for solving the conflict between the settings, for example, JP 2009-211713 A discloses a user interface control device including a conflict solving unit which solves a conflict by setting a second setting value already held by a printer driver to a value which does not cause the conflict with a first setting value when the first setting value has been input via a user interface of the printer driver for generating print data to be transmitted to the print device, a control unit which cannot set a control which is an instruction unit of the user interface of the printer driver according to the second setting value in a state where the conflict is solved by the conflict solving unit, and an informing unit which informs the reason why the control cannot be set by the control unit of the user by displaying it on the user interface of the printer driver.

However, when the previous setting is automatically changed to solve the conflict between the settings, a user cannot recognize the released setting and where the setting is released. Regarding this problem, in JP 2009-211713 A, the mark indicating the reason why the control cannot be set and that the control cannot be set is displayed near the previous setting (second setting value). However, with this method, the following setting (first setting value) which has caused the conflict between the settings and the place of the following setting cannot be intuitively recognized. Therefore, when the following setting is stopped and the previous setting is returned to the original setting, it takes time to perform a setting operation.

Further, in JP 2009-211713 A, a case is assumed where the previous setting and the following setting are in a single screen. Therefore, for example, when the previous setting and the following setting are in different screens from each other, the user who performs the following setting which has caused the conflict between the settings cannot recognize the mark and the reason displayed near the previous setting in the different screen. Therefore, it is possible that a print instruction is issued without noticing the change of the previous setting, and there is a problem in that a desired output cannot be obtained.

SUMMARY OF THE INVENTION

The present invention has been made in consideration of the above problems, and a main object thereof is to provide a print setting control program and a print setting control method which can easily recognize the setting change performed to solve the conflict between the settings and can appropriately perform printing processing.

To achieve the abovementioned object, according to an aspect, a non-transitory recording medium storing a computer readable print setting control program operated by a device for instructing an image forming apparatus to print, the print setting control program reflecting one aspect of the present invention causes the device to function as an information acquisition unit which obtains information on a function performed by the image forming apparatus, a display control unit which causes a display unit to display a print setting screen where the function performed by the image forming apparatus is set based on the information, and a prohibition determining unit which determines whether a previous setting which has been previously performed by using the print setting screen conflicts with a following setting performed later and changes the previous setting to a setting which does not conflict with the following setting when the settings conflict with each other, and the display control unit decorates displays at set positions of the previous setting and the following setting when the previous setting is changed due to the conflict between the settings.

To achieve the abovementioned object, according to an aspect, a print setting control method for a device for instructing an image forming apparatus to print reflecting one aspect of the present invention comprises performing information obtaining processing for obtaining information on a function performed by the image forming apparatus, display control processing for making a display unit display a print setting screen where the function performed by the image forming apparatus is set based on the information, and prohibition determining processing for determining whether a previous setting which has been previously performed by using the print setting screen conflicts with a following setting performed later and changing the previous setting to a setting which does not conflict with the following setting when the settings conflict with each other, wherein in the display control processing, when the previous setting has been changed due to the conflict between the settings, displays at set positions of the previous setting and the following setting are decorated.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 5 is a diagram of a part of the finish screen (a state where Z-folding is selected);

FIG. 6 is a diagram to describe the Z-folding;

FIG. 7 is a diagram of a part of the finish screen (a state where the Z-folding is turned off);

FIG. 8 is a diagram of a part of the layout screen (a state where a booklet is selected);

FIG. 9 is a diagram of a part of the finish screen (a state where face up is changed to be turned off);

FIG. 11 is a diagram of a part of the finish screen (a state where the Z-folding is selected);

FIG. 12 is a diagram of a part of the finish screen (a state where the face up is selected and the Z-folding is changed to be turned off) according to the first embodiment of the present invention;

FIG. 21 is a diagram of a part of the finish screen (a state where the Z-folding is selected);

FIG. 22 is a diagram of a part of a finish screen (a state where face up is selected and Z-folding is changed to be turned off) according to a second embodiment of the present invention;

DESCRIPTION OF THE PREFERRED EMBODIMENTS

Hereinafter, an embodiment of the present invention will be described with reference to the drawings. However, the scope of the invention is not limited to the illustrated examples.

As described in Background of the Invention, a current printer driver performs processing for automatically releasing a previous setting when settings conflict each other (change the previous setting to a setting which does not conflict with a following setting). However, when the previous setting is automatically changed to solve the conflict between the settings, a user cannot recognize the released setting and where the setting is released. Regarding this problem, a method has been proposed for displaying a mark and a reason why the setting is unavailable near the previous setting. However, with this method, since the user cannot intuitively recognize the following setting which has caused the conflict between the settings and the place of the following setting, it takes time to perform an operation for resetting the setting. Further, when the previous setting and the following setting are respectively displayed on different screens, the user who has performed the following setting which has caused the conflict between the settings cannot recognize the marks and messages respectively displayed on the different screens. Therefore, when the user makes a print instruction without noticing a setting change, the user cannot obtain a desired output.

In one embodiment of the present invention, when the previous setting (setting by user or default setting) conflicts with the following setting and prohibition processing for changing the previous setting to solve the conflict between the settings is performed, generation of the conflict between the settings is informed of the user by decorating set positions of the previous setting and the following setting. For example, the mark for informing the generation of the conflict between the settings of the user is displayed near not only the set position of the previous setting but also the set position of the following setting. In addition, when the previous setting and the following setting are respectively performed on different screens, the mark for informing the generation of the conflict between the settings of the user is displayed near an instruction position (for example, tab) to instruct to switch the screen to the screen of the previous setting in the screen where the following setting is performed. Further, when a cursor is moved close to the mark, a message for informing the generation of the conflict between the settings of the user is displayed corresponding to the mark. These marks and messages can guide the user to the set position of the previous setting which has been automatically changed by the prohibition processing. Therefore, an operation for confirming and changing the setting can be easily performed, and printing processing can be appropriately performed.

First Embodiment

Figure 1A:
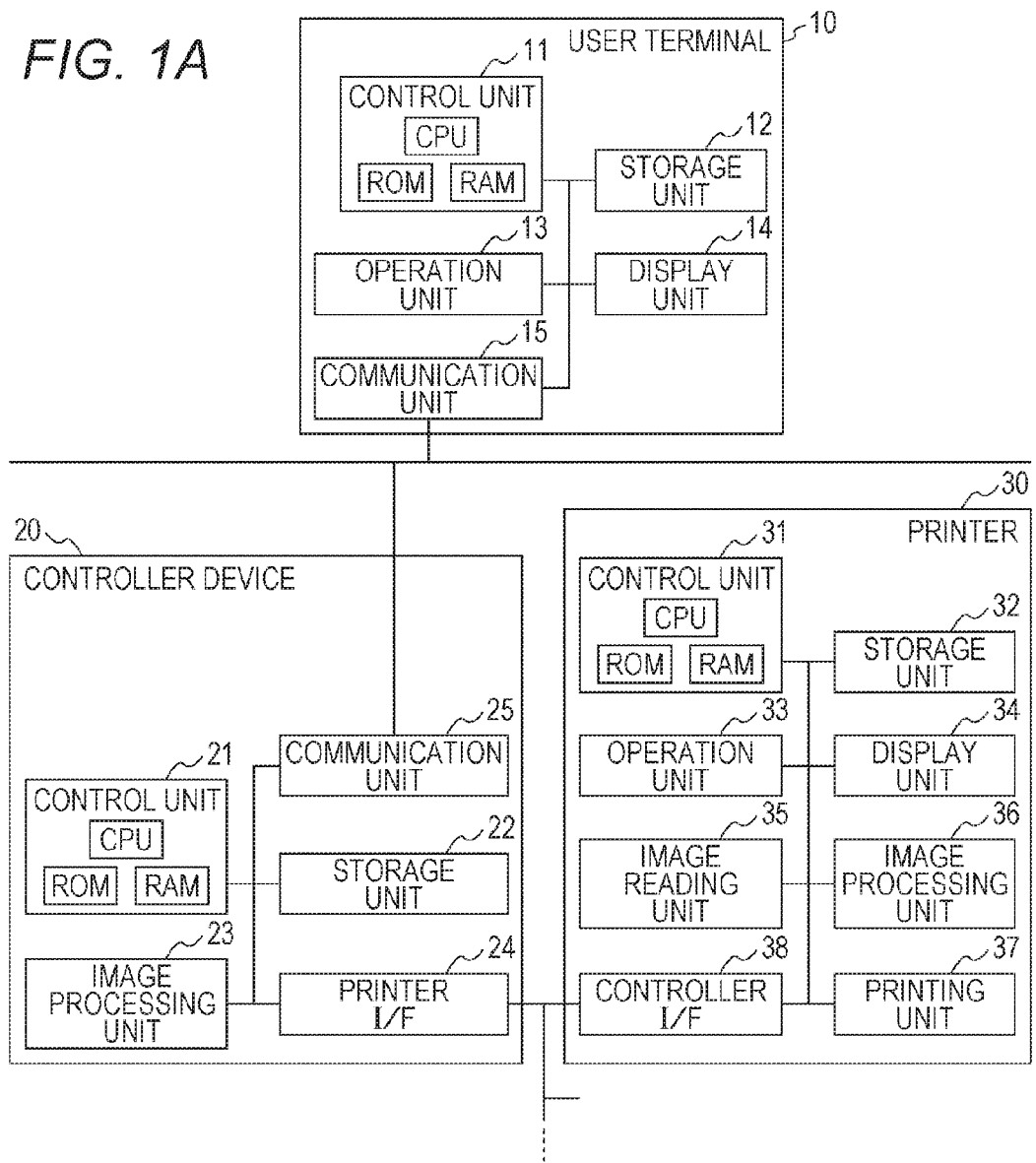
FIGS. 1A and 1B are block diagrams of a structure of a printing system according to a first embodiment of the present invention.
Figure 1B:
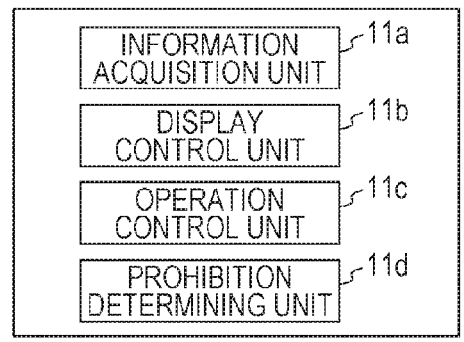
Figure 2A:
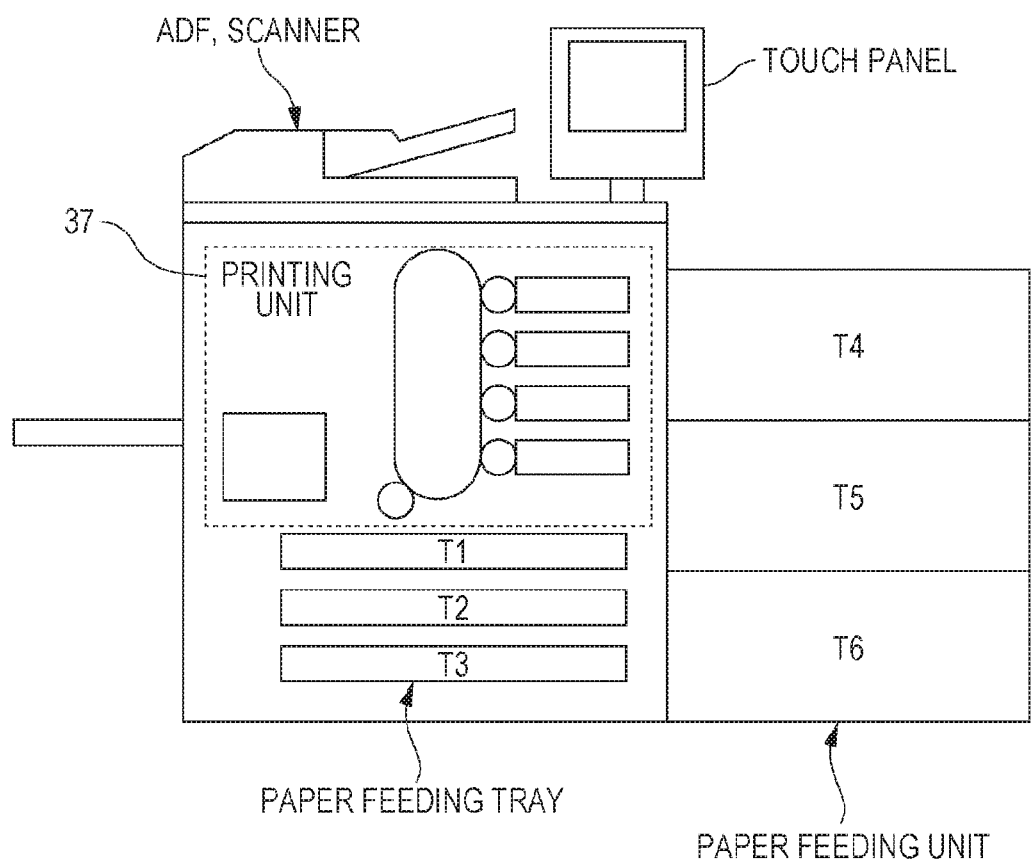
FIGS. 2A and 2B are schematic diagrams of an outline structure of an image forming apparatus and an operation of a printing unit according to the first embodiment of the present invention.
Figure 2B:
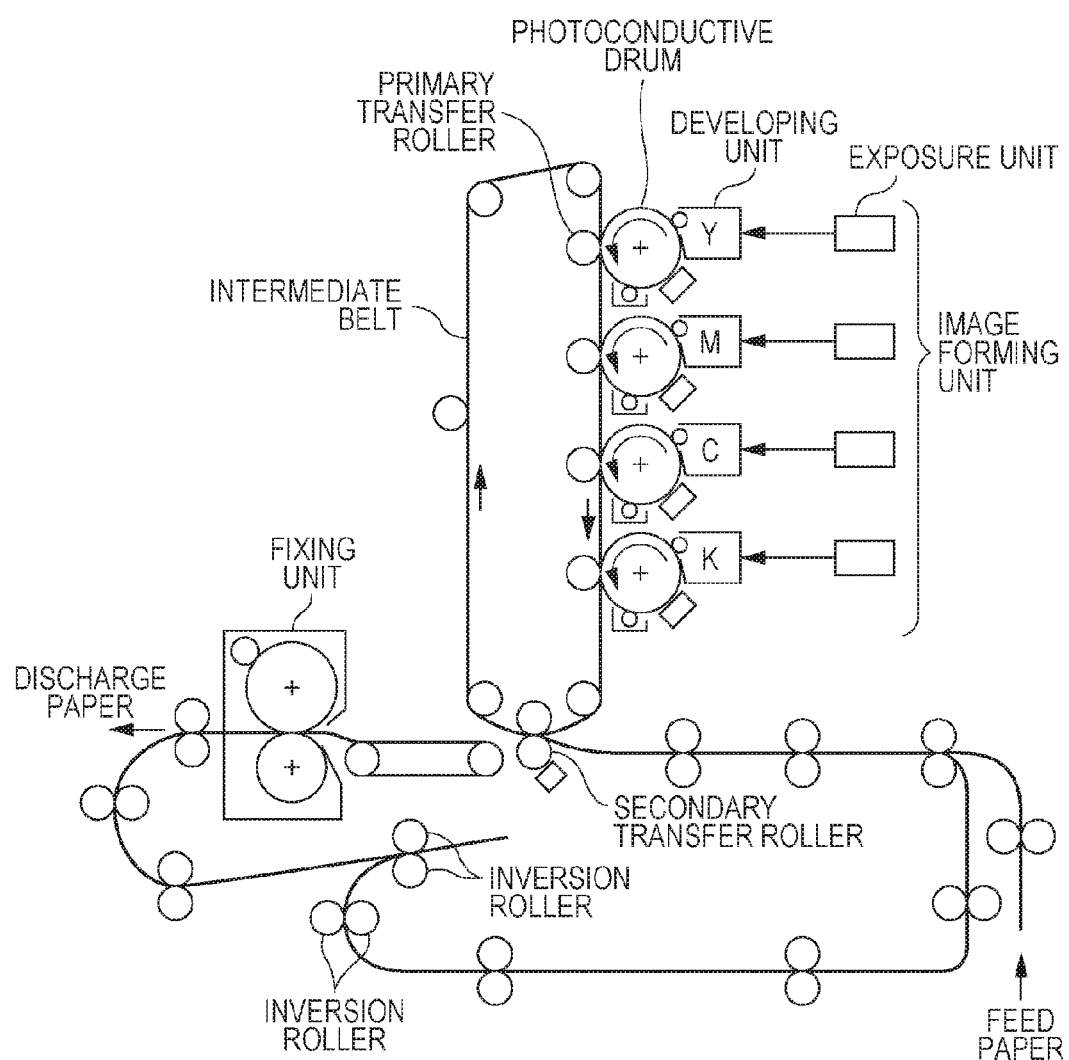
Figure 10:
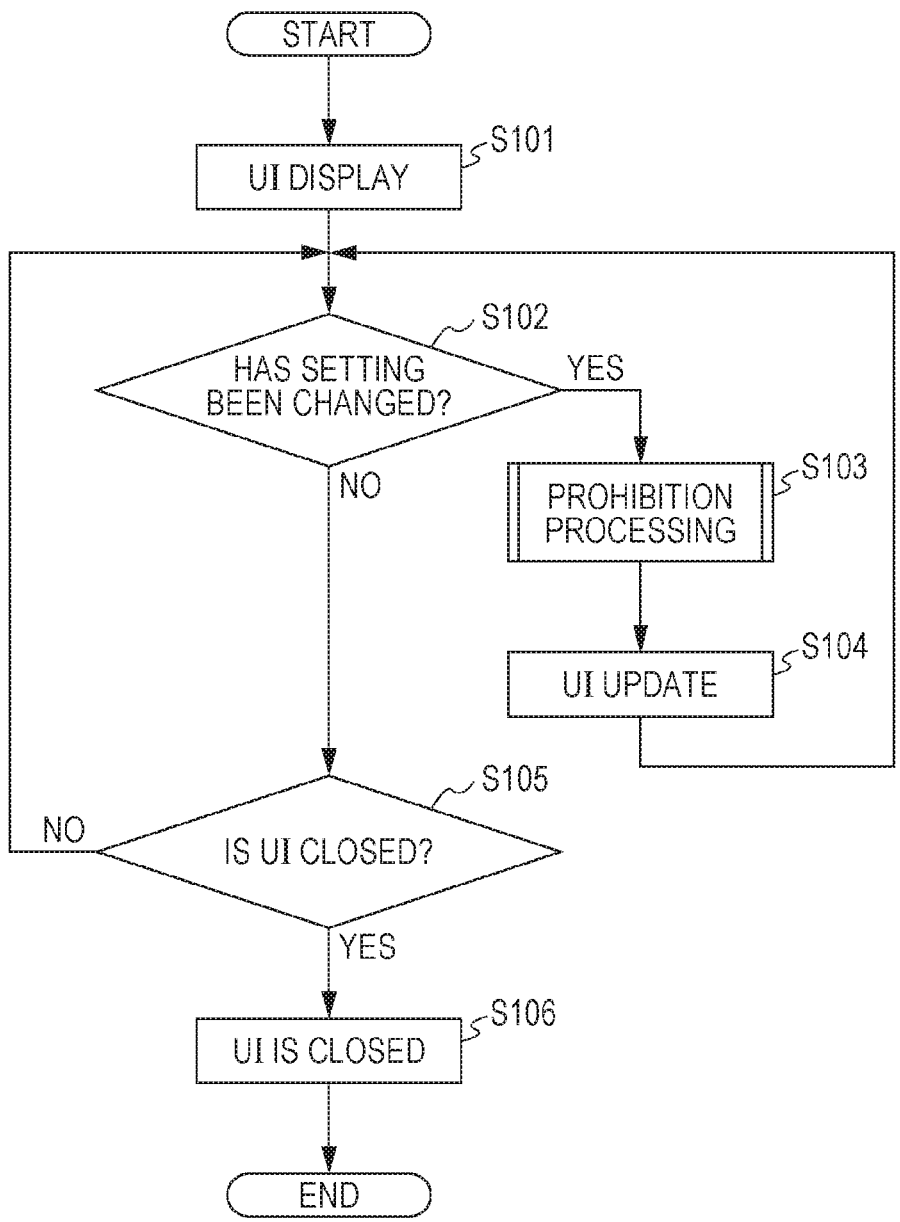
FIG. 10 is a flowchart of processing of a print setting control program according to the first embodiment of the present invention.

To describe embodiments of the present invention in detail, a print setting control program and a print setting control method according to a first embodiment of the present invention will be described with reference to FIGS. 1A and 1B to FIG. 20. FIGS. 1A and 1B are block diagrams of a structure of a printing system according to the present embodiment, and FIGS. 2A and 2B are schematic diagrams of an outline structure of an image forming apparatus and an operation of a printing unit. Further, FIGS. 3 to 5 and FIGS. 7 to 9 are examples of conventional print setting screen, and FIG. 6 is a diagram to describe Z-folding. Further, FIG. 10 is a flowchart of processing of the print setting control program according to the present embodiment, and FIGS. 11 to 20 are examples of a print setting screen according to the present embodiment.

As illustrated in FIG. 1A, the printing system according to the present embodiment includes a user terminal 10, a controller device 20, and an image forming apparatus (referred to as a printer 30 below), which can be connected via a communication network, arranged on the Intranet. That is, the user terminal 10 or the controller device 20 according to the present embodiment functions as a printing control device for performing a print instruction to the printer 30. Although the Ethernet (registered trademark) and the like can be used as a standard of the communication network, IEEE1394 and Parallel can be used to transfer data from the controller device 20 to the printer 30 other than the Ethernet (registered trademark). Further, the controller device 20 is separately provided from the printer 30 in FIG. 1A. However, the controller device 20 may be included in the printer 30. Each device will be described in detail below.

[User Terminal]

The user terminal 10 is a computer apparatus such as a personal computer and includes a control unit 11, a storage unit 12, an operation unit 13, a display unit 14, and a communication unit 15 as illustrated in FIG. 1A.

The control unit 11 includes memories such as a central processing unit (CPU), a read only memory (ROM), and a random access memory (RAM). The control unit 11 performs various processing by cooperating with various programs stored in the ROM and the storage unit 12 and performs central control to each part of the user terminal 10. For example, the control unit 11 reads a printer driver from the storage unit 12 and performs the processing, and the control unit 11 converts data in an application file format created by various applications into PDL data such as the printer control language (PCL) and the PostScript. Further, the control unit 11 displays a print setting screen to set the number of printing units, a paper feeding tray used for printing, double side/single side printing, color/monochrome printing, an integrating function such as 2in1, a finishing function such as folding, punching, and stapling on the display unit 14 and generates setting data of printing conditions according to the operation by the user on the print setting screen. As a result, the PDL data includes image information and print setting information.

Further, the control unit 11 reads the print setting control program (printer driver) from the storage unit 12 and performs the processing. The print setting control program causes the control unit 11 to function as an information acquisition unit 11a, a display control unit 11b, an operation control unit 11c, and a prohibition determining unit 11d as illustrated in FIG. 1B.

The information acquisition unit 11a obtains device information (identification information and function information) of the printer 30 connected to the network and a print job corresponding to the printer 30 (may be a job ticket to be described) from the controller device 20 and specifies a function which can be performed by each printer 30 and a function specified by each print job.

Figure 3:
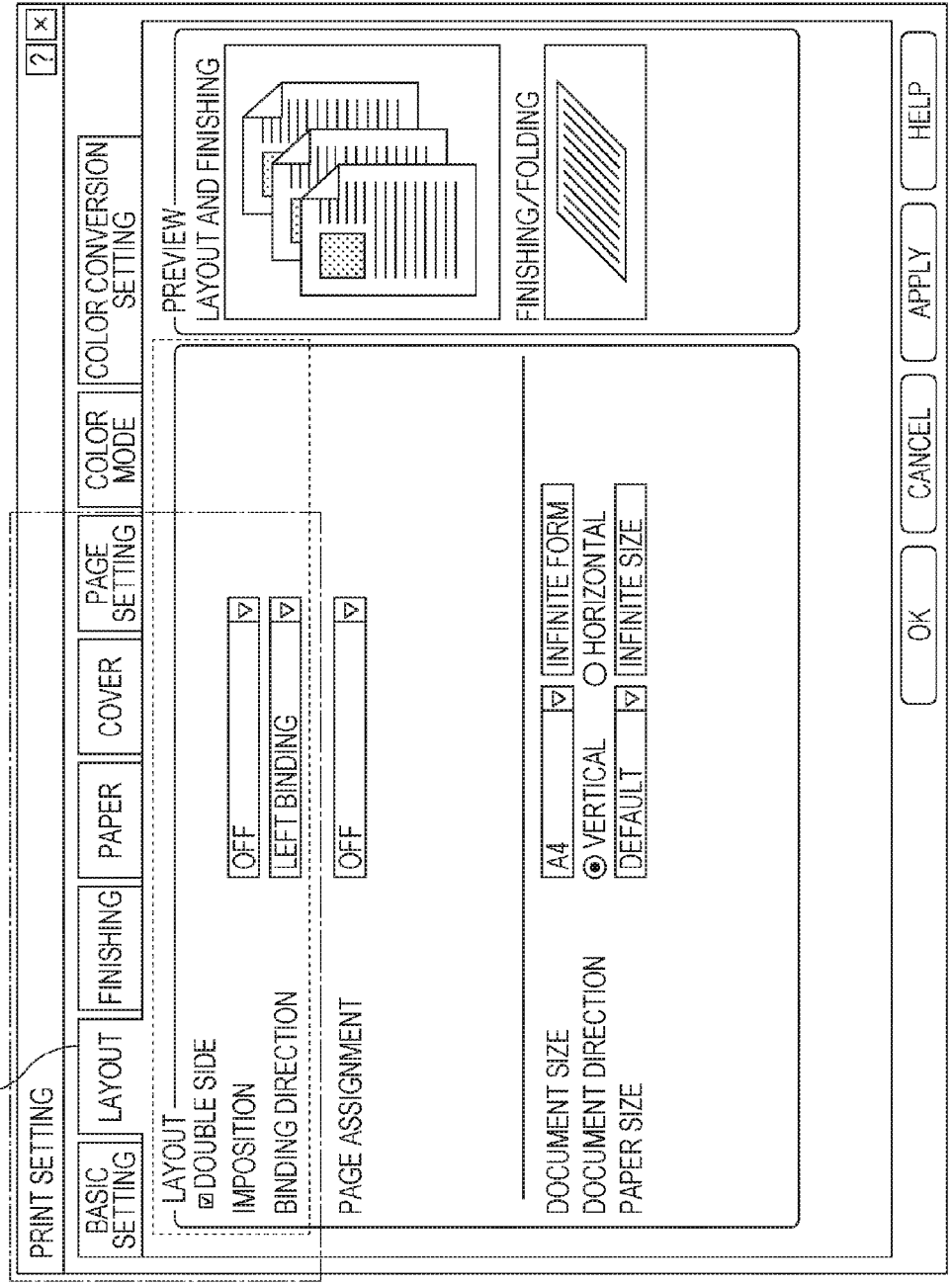
FIG. 3 is a diagram of an exemplary print setting screen (layout screen)
Figure 4:
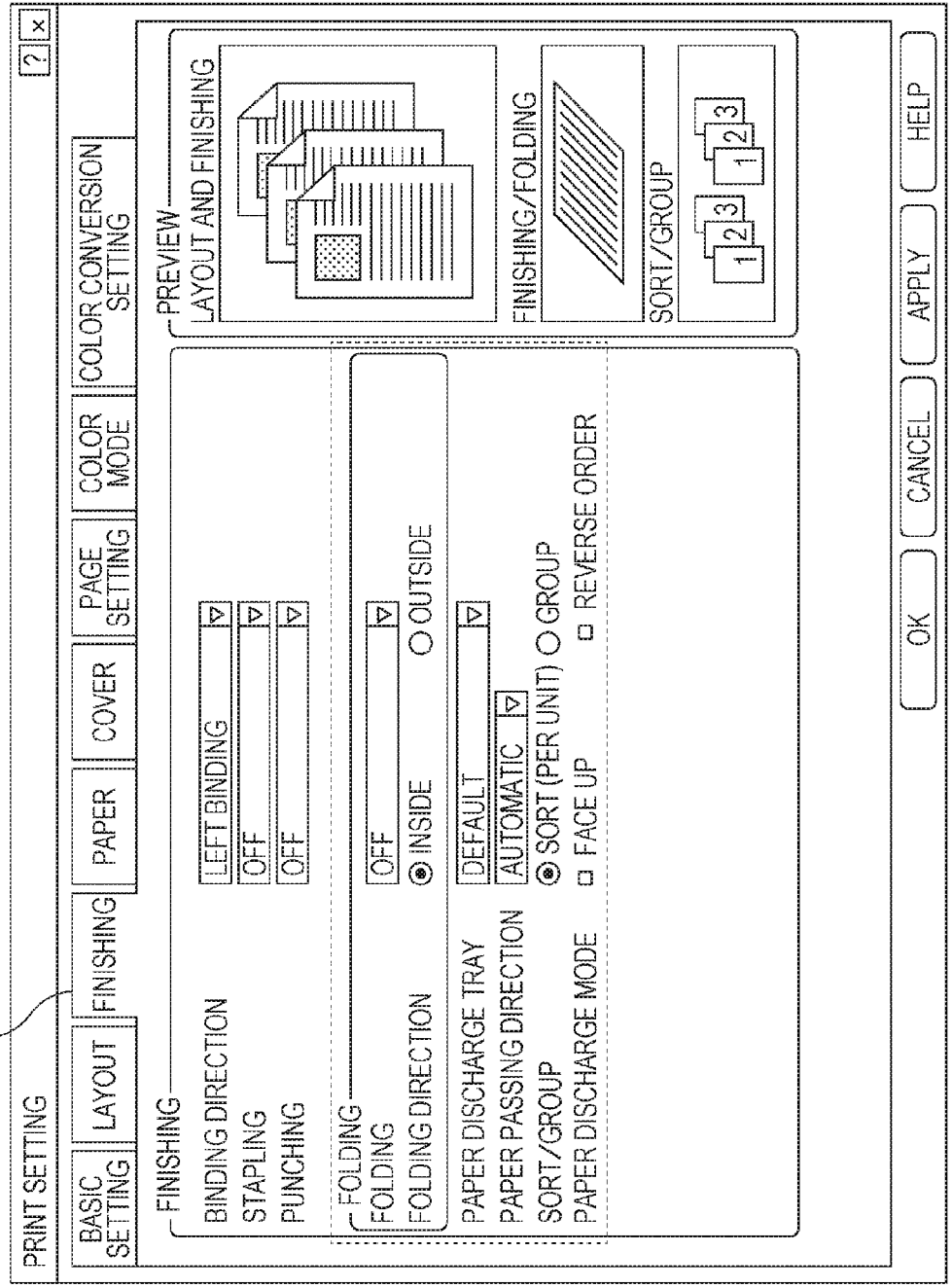
FIG. 4 is a diagram of an exemplary print setting screen (finish screen)

The display control unit 11b controls the display unit 14 and displays the print setting screen where the functions which can be performed by the printer 30 can be set. For example, as illustrated in FIGS. 3 and 4, the functions which can be performed by the printer 30 are classified by using tabs 41, a detailed function allocated to the tab 41 is displayed on a setting screen of the selected tab 41. At this time, when the default setting (previously set setting or setting of the print job in the past) has been used, the functions are changed to the default setting. Further, according to operation information informed from the operation control unit 11c, the display on the print setting screen is updated (setting state of the function is changed). Further, when the previous setting has been changed by the prohibition determining unit 11d, the display control unit 11b displays a mark (first mark) to inform the generation of the conflict between the settings of the user near the set position of the previously set function which conflicts with the function which has been set later. Further, the display control unit 11b displays a mark (second mark) to inform the generation of the conflict between the settings of the user near the set position of the function which has been set later. Further, when the function which has been set later and the previously set function are respectively displayed on different setting screens, the display control unit 11b displays a mark (third mark) to inform the generation of the conflict between the settings of the user near an instruction position (tab) to switch the screen to the setting screen on which the previously set function is displayed. In addition, the display control unit 11b displays a message to inform the generation of the conflict between the settings of the user as corresponding it to the mark according to the operation information informed from the operation control unit 11c.

The operation control unit 11c monitors the operation of the operation unit 13 by the user and informs the operation information indicating the set function of the display control unit 11b and the prohibition determining unit 11d when detecting the operation for setting the function. Further, the operation control unit 11c monitors an instruction position of the cursor on the print setting screen and informs the operation information of the display control unit 11b when detecting the operation for moving the cursor close to the mark (cursor is moved closer to the mark or is overlapped with the mark).

The prohibition determining unit 11d specifies the setting of each function based on the operation information and the default setting information informed from the operation control unit 11c and determines whether the settings conflict with each other with reference to a prohibition table in which the conflict settings are written. When the settings conflict with each other, the prohibition determining unit 11d performs the prohibition processing for changing the previous setting which has been set by the user or has been set as a default and informs the settings which conflict with each other (following setting and previous setting) of the display control unit 11b.

The storage unit 12 includes of a memory, a hard disk drive (HDD), and the like and stores various programs such as the printer driver executed by the control unit 11, data necessary for executing the program (PDL data, operation information, default setting information, and prohibition table), and the like. The operation unit 13 includes a mouse and a keyboard. The operation unit 13 generates an operation signal according to the operations of the mouse and the keyboard and outputs it to the control unit 11 (operation control unit 11c). The display unit 14 includes a display such as a liquid crystal display (LCD) and displays the print setting screen and the result of the processing by the control unit 11 according to display control by the control unit 11 (display control unit 11b).

The communication unit 15 includes a communication interface such as a network I/F and communicates with the controller device 20 via the network such as the Intranet. For example, the communication unit 15 receives information necessary for print setting (for example, the device information and the print job of the printer 30) from the controller device 20 and transmits the setting data of the printing condition together with the PDL data to be printed to the controller device 20.

[Controller Device]

The controller device 20 is a computer apparatus and rasterizes the PDL data transmitted from the user terminal. Then, the controller device 20 generates image data. Further, the controller device 20 allocates a printing work to the printer 30. The controller device 20 includes a control unit 21, a storage unit 22, an image processing unit 23, a printer I/F 24, a communication unit 25, and the like as illustrated in FIG. 1A.

The control unit 21 includes memories such as a CPU, a ROM, and a RAM. The control unit 21 performs various processing by cooperating with various programs stored in the ROM and the storage unit 22 and performs central control to each part of the controller device 20. For example, the control unit 21 analyzes the setting data of the printing condition and creates the job ticket relative to the printer 30. Then, the control unit 21 transmits it to the printer 30 via the communication unit 25. The job ticket is instruction information of the print job to be performed by each printer 30, and the print job is a printing work to be performed by the printer 30. The job ticket includes the printing condition such as the number of printing units, the paper feeding tray used for printing, double side/single side printing, color/monochrome printing, the integrating function such as 2 in 1, the finishing function such as folding, punching, and stapling. Further, the control unit 21 stores the image data generated by the image processing unit 23 and the setting data of the printing condition instructed by the user terminal 10 in the storage unit 22 as past job information.

The storage unit 22 includes a memory, a HDD, and the like and stores a program used by the control unit 21 and data necessary for executing the program. Further, the storage unit 22 stores the print job (image data and job ticket) for each printer 30, the print job which is temporality stored to instruct to print, the device information of the printer 30 connected to the network, and the like. The image processing unit 23 rasterizes the PDL data transmitted from the user terminal 10. The image data in a bitmap format generate by the rasterizing processing is transmitted to the printer 30 via the printer I/F 24 together with the job ticket.

The printer I/F 24 is an exclusive interface to be connected to the printer 30 which is a master. The printer I/F 24 transmits the image data, the job ticket, and the like to the printer 30 and obtains the device information from the printer 30. The communication unit 25 includes a communication interface such as the network I/F and communicates with the user terminal 10. For example, the communication unit 25 receives the PDL data from the user terminal 10 and transmits the device information and the past print job of the printer 30 stored in the storage unit 22 to the user terminal 10. When the printer 30 has a structure which can be connected to the network, the image data and the job ticket may be transmitted to the printer 30 via the communication unit 25 and the device information may be obtained from the printer 30. Further, the device information of the printer 30 may be obtained by using the management information base (MIB).

[Printer]

The printer 30 is a multi-functional peripheral for performing printing according to the instruction by the controller device 20. The printer 30 includes a control unit 31, a storage unit 32, an operation unit 33, a display unit 34, an image reading unit 35, an image processing unit 36, a printing unit 37, a controller I/F 38, and the like as illustrated in FIG. 1A.

The control unit 31 includes memories such as a CPU, a ROM, a RAM, and the like. The control unit 31 reads various programs stored in the ROM and the storage unit 32 and performs various processing and performs central control to each part of the printer 30. For example, the control unit 31 analyzes the job ticket transmitted from the controller device 20 and obtains the instruction information of the printing condition. The control unit 31 applies the obtained instruction information of the printing condition to the image data transmitted from the controller device 20 and causes the printing unit 37 to perform the printing processing. Further, the control unit 31 controls conveyance of paper at the time of printing. After the printing has been performed, the control unit 31 stores the image data which has been printed and the printing condition to the storage unit 32 as past job information.

The storage unit 32 includes a memory, a HDD, and the like and stores a program used by the control unit 31 and data necessary for executing the program. Further, the storage unit 32 stores the job information and the image data which has executed in the past and the job information and the image data which are temporality stored to be printed. The operation unit 33 includes a touch panel and an operation key. The operation unit 33 generates an operation signal according to the operation of the touch panel and the operation key and transmits it to the control unit 31. The display unit 34 includes a display such as a LCD and displays various screens on the touch panel according to the display control of the control unit 31.

The image reading unit 35 optically scans a document conveyed by an auto document feeder (ADF) with a scanner and reads it as an image signal (analog signal). The image processing unit 36 performs A/D conversion to the image signal read by the image reading unit 35 and obtains image data (digital data). Further, the image processing unit 36 performs image processing to the image data. The image processing is, for example, compression/decompression processing, enlargement/reduction processing, gradation correction processing, and screen processing. Further, the image processing unit 36 performs pulse width modulation (PWM) conversion to the image data to which the image processing has been performed and outputs it to the printing unit 37.

The printing unit 37 performs the printing processing based on the image data to which the PWM has been performed (detail will be described below). The controller I/F 38 is an exclusive interface to be connected to the controller device 20. The controller I/F 38 obtains the image data, the job ticket, and the like from the controller device 20 and transmits the device information of the printer 30 to the controller device 20.

A structure of the printer 30 and an operation of the printing unit 37 will be described with reference to FIGS. 2A and 2B. As illustrated in FIG. 2A, the ADF, the scanner (image reading unit 35), the touch panel (operation unit 33 and display unit 34), and the like are provided on a top part of a main body of the printer 30. Further, the printing unit 37 is provided in the main body, and printing can be performed by using toners having four colors, i.e., yellow (Y), magenta (M), cyan (C), and black (K). For example, three paper feeding trays T1 to T3 for housing paper are provided in a bottom part of the printer 30. The printer 30 can include a paper feeding unit having the paper feeding tray with a large capacity other than the paper feeding trays T1 to T3 provided in the main body. An example in which the paper feeding unit is provided in the printer 30 is illustrated in FIG. 2A. For example, the paper feeding unit includes three paper feeding trays T4 to T6 with a large capacity.

As illustrated in FIG. 2B, the printing unit 37 includes image forming units (Y, M, C, and K), an intermediate belt, a secondary transfer roller, a fixing unit, and the like. The image forming units (Y, M, C, and K) form a toner image on the intermediate belt. Each image forming unit includes an exposure unit, a developing unit, a photoconductive drum, and a primary transfer roller. At the time of printing, the exposure unit irradiates the photoconductive drum with a laser beam and forms an electrostatic latent image according to a PWM signal generated by performing the PWM conversion to the image data. The developing unit develops it and forms the toner image on the photoconductive drum. The toner image on the photoconductive drum is transferred on the intermediate belt by the primary transfer roller.

The toner images with colors formed by the respective image forming units (Y, M, C, and K) are overlapped to each other and transferred at the same position on the rotating intermediate belt, and a color image formed of four color toners is formed on the intermediate belt. At the timing when the color image on the intermediate belt reaches the position of the secondary transfer roller, the paper is fed from any one of paper feeding trays T1 to T6. The color image is transferred on the paper by the secondary transfer roller, and the printed paper is conveyed to the fixing unit. Then, fixing processing is performed to the paper.

Further, the image forming apparatus includes an inversion unit (inversion roller) for inverting the paper and feeding the paper again. At the time of the double side printing, the paper discharged from the fixing unit is conveyed to the inversion unit after the surface is printed. The paper inverted by passing through the inversion unit is conveyed to the position of the secondary transfer roller again in order to perform the printing on the rear surface.

FIGS. 1A and 1B and 2A and 2B are examples of the printing system according to the present embodiment, and the structure and the control of the system can be appropriately changed. For example, in the above, the structure is used in which the control unit 11 of the user terminal 10 operates the print setting control program (printer driver) and the device information of the printer 30 is obtained from the controller device 20 and the print setting screen is displayed on by the display unit 14. However, when the controller device 20 functions as a Web server for providing a function of a Web application and the user terminal 10 functions as a Web client for using the function of the Web application, the structure may be used in which the control unit 21 of the controller device 20 operates the print setting control program and the print setting screen is generated based on the device information of each printer 30 stored in the storage unit 22 and the generated print setting screen is displayed on the display unit 14 of the user terminal 10. Further, a structure may be used in which the display unit is provided in the controller device 20 and the generated print setting screen is displayed on the display unit.

A screen displayed by the print setting control program (printer driver) according to the present embodiment will be described below. The user creates a document to be printed by using an optional application (text creating software and spreadsheet software). A print setting dialog is opened from the application, and the print setting screen of the printer driver is displayed. The user sets the function on the print setting screen and issues a print instruction.

FIGS. 3 and 4 are examples of a print setting screen 40. The print setting screen 40 includes a plurality of screens which can be switched by the tabs 41. When a desired tab 41 is selected, the functions which can be set on the setting screen by using the tab 41 are displayed. For example, as illustrated in FIG. 3, when the tab 41 of "layout" is selected, a layout screen 40a is displayed, and the double side printing (on/off), the imposition (off/adhesive binding/booklet/2 in ½ repeat/rotation 2 repeat/4 repeat), the binding direction (left binding/right binding/upper binding), the page assignment (off/2 in ¼ in ⅙ in ⅛ in ⅑ in ¹⁄₁₆ in 1), the document size (finite form/infinite form), the document direction (vertical/horizontal), and the paper size (finite form/infinite form) can be set.

Further, as illustrated in FIG. 4, when the tab 41 of "finishing" is selected, a finish screen 40b is displayed, and the binding direction (left binding/right binding/upper binding), stapling (off/corner/two points), punching (off/two-hole/three-hole/four-hole), folding (off/center folding/Z-folding/folding into three/double-leafed folding), the paper discharge tray, the paper passing direction (automatically/long side/short side), the sort/group for setting whether a plurality of sheets is printed for each group of sheets, the paper discharge mode (face up/reverse order) can be set. The user can instruct to print in a desired printing condition by setting the function by using a radio button and a drop down list.

FIG. 5 is a diagram of an enlarged broken line part of the finish screen 40b in FIG. 4. As illustrated in FIG. 5, when the "folding" is set to the "Z-folding", for example, a print output folded in a Z-shape in the A4 size can be obtained as illustrated in FIG. 6 in a case where a document size is the A3 size and a paper size is the A3 size. In the "Z-folding", "face down output" in which a print surface is output as facing downward is normally selected.

Here, when the user sets the "folding" to be the "Z-folding" and sets the "paper discharge mode" to be the "face up", the Z-folding cannot be performed as facing the print surface down due to the structure of the printing unit 37. Therefore, the conflict between the settings is generated. Therefore, when the "paper discharge mode" is set to be the "face up" in a state where the "folding" is set to be the "Z-folding" as illustrated in FIG. 5, the setting of "folding" which has been previously set is automatically changed from the "Z-folding" to "off" to avoid the conflict between the settings as illustrated in FIG. 7.

The conflict between the settings is similarly generated regarding the "booklet" of the "imposition" and the "face up" of the "paper discharge mode". For example, when the "imposition" is set to be the "booklet" on the layout screen 40a (broken line part in FIG. 3) illustrated in FIG. 8 in a state where the "paper discharge mode" is set to be the "face up" as illustrated in FIG. 7, the "face up" of the "paper discharge mode" which has been previously set in the finish screen 40b is automatically changed to be off (uncheck a check box of the "face up" in a case of FIG. 9) to avoid the conflict between the setting as illustrated in FIG. 9.

When the settings of the functions are conflict with each other in this way, the printing processing can be continued by automatically avoiding the conflict. However, the "folding" and the "paper discharge mode" are respectively displayed in different places, and the user focuses attention on the "paper discharge mode" which has been set later. Therefore, there is a case where the user misses that the setting of the "folding is changed from the "Z-folding" to "off". Especially, when the "imposition" is set on the layout screen 40a and the "paper discharge mode" is set on the finish screen 40b (that is, "booklet" of "imposition" and "face up" of "paper discharge mode" are respectively displayed on different screens), the user who is setting the "imposition" on the layout screen 40a cannot recognize that the "face up" of the "paper discharge mode" is changed to be off in the finish screen 40b. Therefore, it is difficult to confirm the change of the setting and to perform the operation to reset the setting by coming and going between both settings. Further, when the print output is performed without noticing the setting change, the output which is not intended by the user is obtained, and the paper and the toner are wastefully consumed.

In the present embodiment, in order to surely inform the changed function and the change result of the user at the time when the conflict between the settings is generated, the information for informing the generation of the conflict between the settings of the user (mark formed of letters and figures) is displayed at the set position of the setting which has been previously set (referred to as previous setting below) and the set position of the setting which has been set later (referred to as following setting below). Processing in a case where the mark is displayed by using the print setting control program according to the present embodiment will be described below. The CPU performs processing in each step illustrated in the flowchart in FIG. 10 by developing the print setting control program stored in the ROM or the storage unit 12 to the RAM and executing it. It is assumed that the print setting control program (information acquisition unit 11a) have previously obtained the function information regarding the functions which can be performed by the printer 30 from the controller device 20.

First, the print setting control program (display control unit 11b) displays a user interface (UI) to set the function which can be performed by the printer 30 on the display unit 14 based on the function information of the printer 30 obtained from the controller device 20 by the information acquisition unit 11a (S101). In the present embodiment, the print setting screens 40 illustrated in FIGS. 3 and 4 are displayed.

Next, the print setting control program (operation control unit 11c) monitors a setting operation of the function by the user and determines whether the setting has been changed (S102). When the setting has been changed, the print setting control program (prohibition determining unit 11d) confirms whether the prohibition in which the settings conflict with each other is generated, and the print setting control program performs processing for changing the previous setting which conflicts (prohibition processing) when the prohibition is generated (S103).

After that, the print setting control program (display control unit 11b) updates the display on the print setting screen 40 according to the result of the prohibition processing (S104). At this time, the marks indicating that the settings have been automatically changed by the prohibition processing are displayed near the set position of the following setting, the set position of the previous setting, and the instruction position to instruct to switch the screen on which the function of the previous setting is displayed (tab and the like), and this notifies that the setting has been changed of the user. After that, the procedure returns to S102, and the setting operation is monitored.

When the setting has not been changed, the print setting control program (operation control unit 11c) monitors an operation for closing the print setting screen 40 ("OK" and an instruction of "cancel" in FIGS. 3 and 4) (S105). When the closing operation is not performed, the procedure returns to S102. When the closing operation is performed, the print setting screen 40 is closed (S106), and a series of print setting processing is terminated.

Next, the control will be particularly described as having a screen displayed by the print setting control program (display control unit 11b) according to the present embodiment as an example.

First, in a state where the tab of "finishing" is selected on the print setting screen 40 and the finish screen 40b illustrated in FIG. 11 is displayed, the "folding" is set to be the "Z-folding". After that, as illustrated in FIG. 12, the "paper discharge mode" is set to be the "face up".

Then, the print setting control program (prohibition determining unit 11d) determines whether the "Z-folding" in previous setting 42a conflicts with the "face up" in following setting 42b. When the settings conflict with each other, the print setting control program (prohibition determining unit 11d) changes the "Z-folding" in the previous setting 42a to "off", and the print setting control program (display control unit 11b) updates the display on the finish screen 40b and displays a mark 43 (second mark) near the following setting 42b (near display position of "face up" of "paper discharge mode"). Accordingly, the print setting control program informs that the setting of the other function has been changed of the user. Further, the print setting control program (display control unit 11b) displays a mark 43 (first mark) near the previous setting 42a (near display position of "off" of "folding") and informs the change of the setting of the user.

Figure 13:
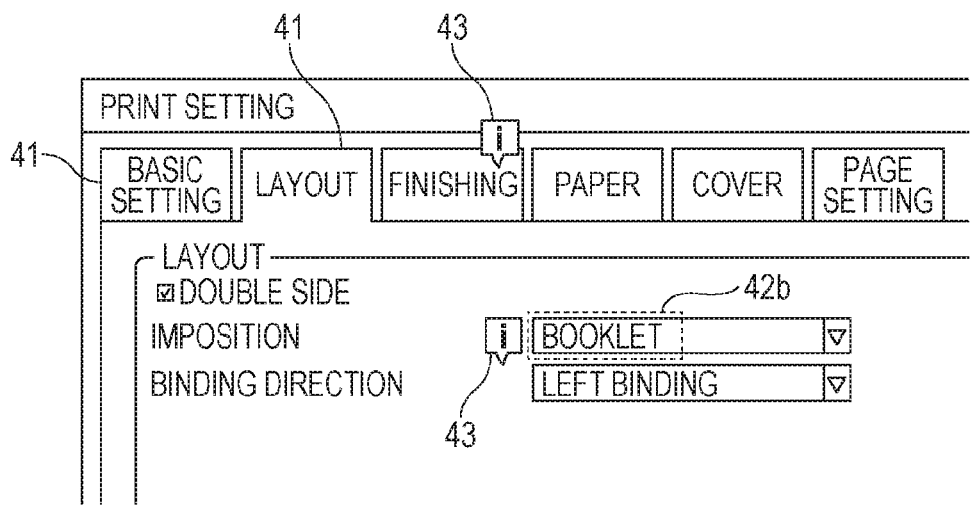
FIG. 13 is a diagram of a part of the layout screen (a state where the booklet is selected) according to the first embodiment of the present invention.

Next, in a state where the "paper discharge mode" in the finish screen 40b is set to be the "face up", the layout screen 40a illustrated in FIG. 13 is displayed, and the "imposition" is set to be the "booklet".

Figure 14:
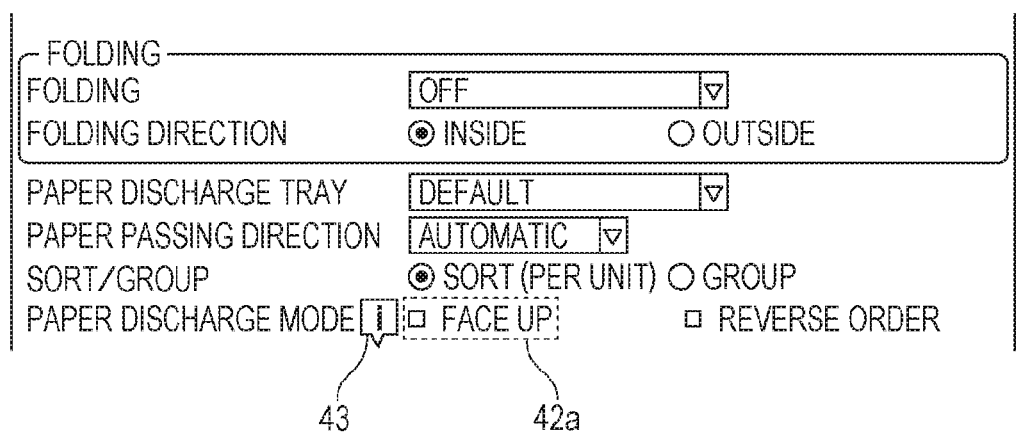
FIG. 14 is a diagram of a part of the finish screen (a state where the face up is changed to be turned off) according to the first embodiment of the present invention.

Then, the print setting control program (prohibition determining unit 11d) determines whether the "face up" in the previous setting 42a conflicts with the "booklet" in the following setting 42b. When the settings conflict with each other, the print setting control program (prohibition determining unit 11d) changes the "face up" in the previous setting 42a to off, and the print setting control program (display control unit 11b) updates the display on the finish screen 40b and displays the mark 43 (second mark) near the following setting 42b of the layout screen 40a (near display position of "booklet" of "imposition") as illustrated in FIG. 13. Accordingly, the print setting control program informs that the setting of the other function has been changed of the user. Further, the print setting control program (display control unit 11b) displays the mark 43 (first mark) near the previous setting 42a (near display position of "face up" of "paper discharge mode") as illustrated in FIG. 14 and informs that the setting has been changed of the user.

Further, the "imposition" is displayed on the layout screen 40a. Whereas, the "paper discharge mode" is displayed on the finish screen 40b. Therefore, there is a case where the user does not notice the mark 43 displayed near the display position of the "face up". The print setting control program (display control unit 11b) displays the mark 43 (third mark) at the instruction position (tab) for instructing to switch the screen to the finish screen 40b where the "paper discharge mode" is displayed and informs that there is a function of which the setting has been changed in the finish screen 40b of the user. Accordingly, the user can recognize that the setting has been changed on the different screen and can confirm the setting by switching the screen to the above different screen.

Figure 15:
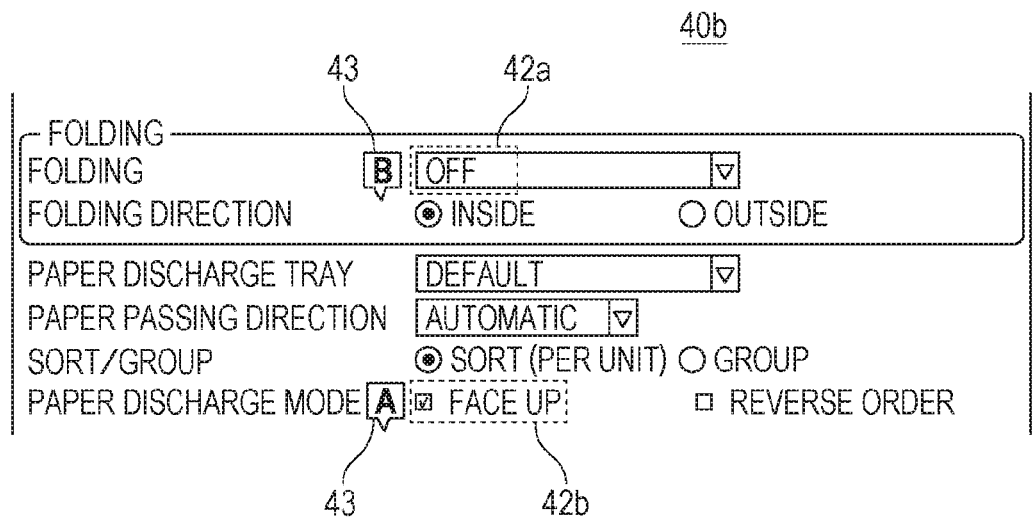
FIG. 15 is a diagram of another example of a part of the finish screen (a state where the face up is changed to be turned off) according to the first embodiment of the present invention.
Figure 16:
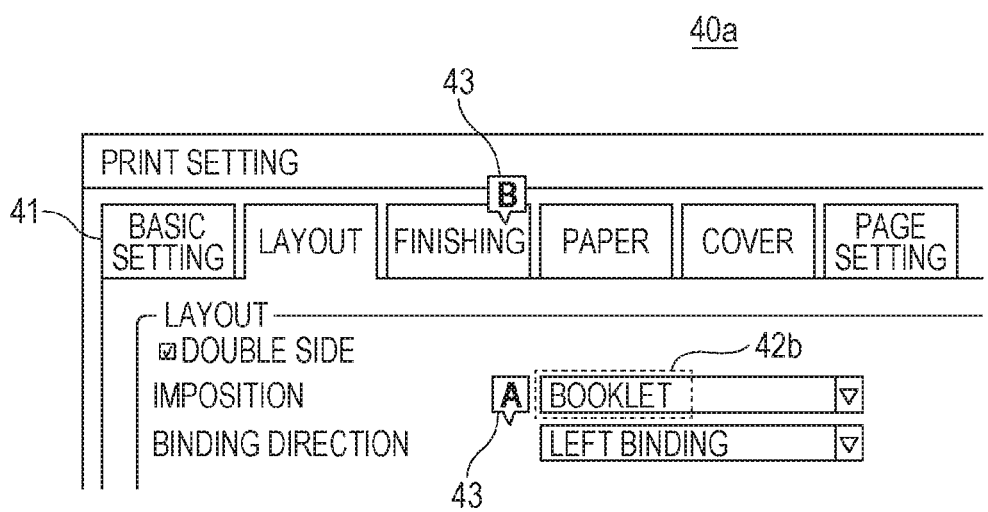
FIG. 16 is a diagram of another example of a part of the layout screen (a state where the booklet is selected) according to the first embodiment of the present invention.
Figure 17:
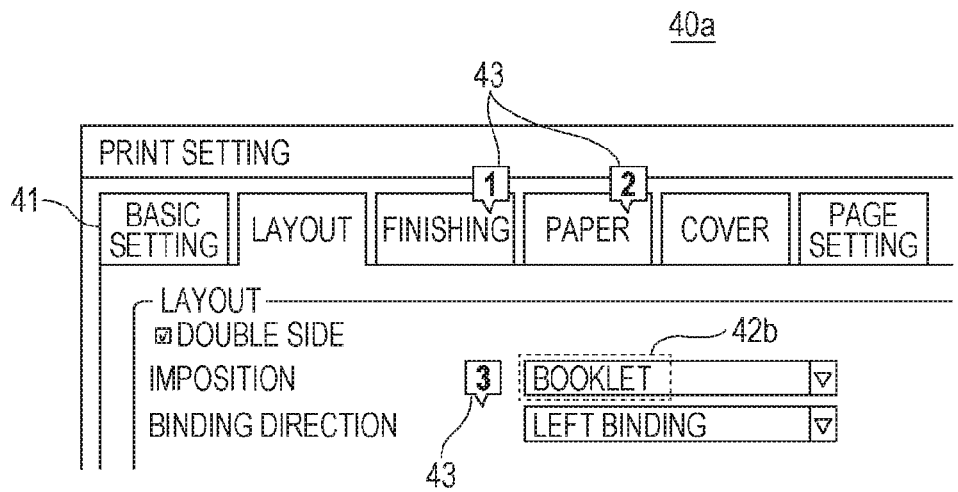
FIG. 17 is a diagram of still another example of a part of the layout screen (a state where the booklet is selected) according to the first embodiment of the present invention.

The marks 43 is FIG. 11 to 14 are examples. When the mark 43 can inform the set positions of the previous setting and the following setting of the user, a display form and a display position of the mark 43 can be appropriately changed. Further, the respective marks 43 displayed near the previous setting 42a, the following setting 42b, and the tab 41 may have the same shapes. For example, as illustrated in FIGS. 15 and 16, the display form of the mark 43 may be changed so as to identify the mark relative to the previous setting 42a and the mark relative to the following setting 42b. Further, in FIGS. 11 to 16, an example has been described in which the following setting 42b conflicts with a single previous setting 42a. However, when the following setting 42b conflicts with a plurality of previous settings 42a, the marks 43 can be displayed near each previous setting 42a and near the tab 41. In this case, as illustrated in FIG. 17, the display forms of the marks 43 may be changed from each other (for example, display numbers) so that the order of the settings is recognized, and the number of previous settings 42a (total number or number of order) which conflicts with the mark 43 displayed near each previous setting 42a so that the number of conflict previous settings 42a is recognized.

Further, the user can recognize the change of the setting by displaying the mark 43. However, for example, when only looking at the mark 43 displayed near the "face up" of the following setting 42b in a case of FIG. 12, the user cannot easily recognize how the previous setting 42a has been changed. Especially, as illustrated in FIG. 13, the screen on which the previous setting 42a is displayed is different from the screen which is currently displayed (screen on which the following setting 42b is displayed), the user cannot recognize which and how the setting has been changed.

Figure 18:
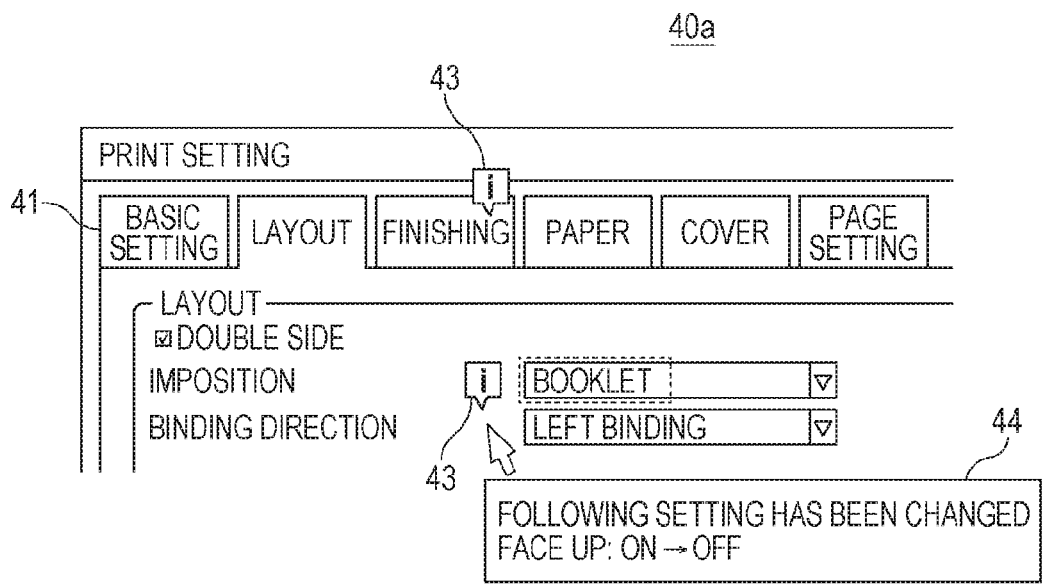
FIG. 18 is a diagram of yet another example of a part of the layout screen (a state where a message is displayed) according to the first embodiment of the present invention.

In this case, a message indicating a content of the setting change can be displayed according to an operation for moving the cursor close to the mark (cursor is moved closer to the mark and is overlapped with the mark). For example, when the "imposition" is set to be the "booklet" on the layout screen 40a after setting the "paper discharge mode" to be the "face up" on the finish screen 40b, the cursor is moved closer to the mark 43 displayed near the "booklet" in the following setting as illustrated in FIG. 18. In this case, the print setting control program (display control unit 11b) can display a message 44 indicating that the setting of the "face up" in the previous setting is changed from on to off (information regarding conflicting setting) corresponding to the mark 43.

Figure 19:
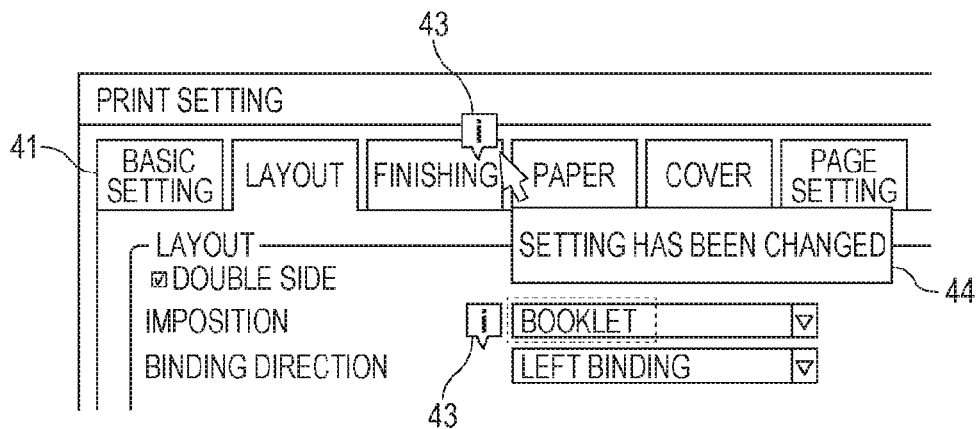
FIG. 19 is a diagram of still yet another example of a part of the layout screen (a state where the message is displayed) according to the first embodiment of the present invention.
Figure 20:
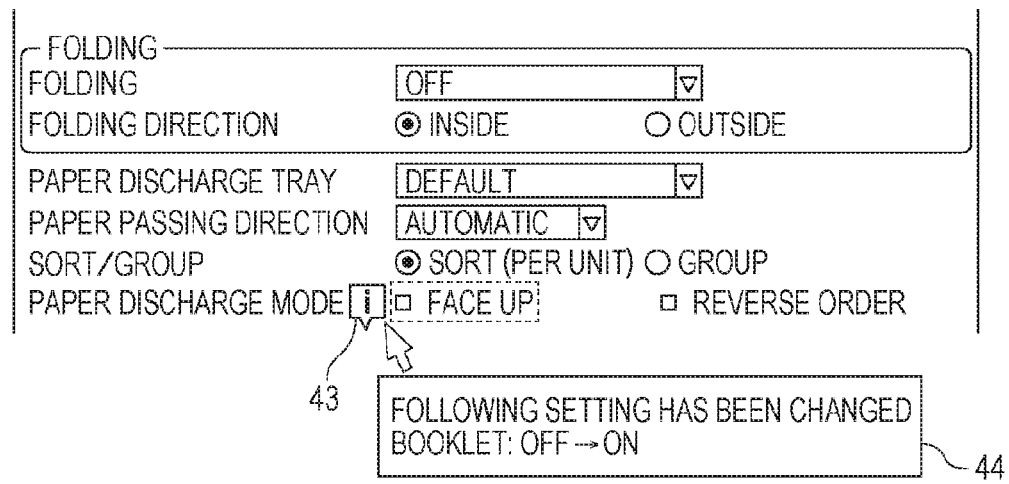
FIG. 20 is a diagram of an example of a part of the finish screen (a state where the message is displayed) according to the first embodiment of the present invention.

Further, as illustrated in FIG. 19, when the cursor is moved closer to the mark 43 displayed near the tab for switching the screen to the finish screen 40b on which the "face up" in the previous setting is displayed, the print setting control program (display control unit 11b) can display the message 44 indicating that the setting in the finish screen 40b has been changed corresponding to the mark 43. Further, as illustrated in FIG. 20, when the cursor is moved closer to the mark 43 displayed near the "face up" in the previous setting, the print setting control program (display control unit 11b) can display the message 44 indicating that the setting of the "booklet" in the following setting is changed from off to on (information regarding conflicting setting) corresponding to the mark 43.

Further, the mark 43 and the message 44 may be non-displayed after a predetermined period has elapsed and at the time when the prohibition is released. For example, when the "booklet" of the following setting and the "face up" of the previous setting becomes the prohibition, the prohibition is released by turning off the "booklet" of the following setting. Therefore, when the "booklet" of the following setting is turned off, the marks 43 near the "booklet" and the "face up" and the mark 43 near the tab 41 for switching the screen to the finish screen 40b can be non-displayed, and the message 44 can be non-displayed.

As described above, in the present embodiment, the marks 43 which indicate the change of the setting are displayed near the set position of the previous setting 42a and the set position of the following setting 42b. Therefore, the previous setting 42a can be easily confirmed, and the operation for resetting the previous setting 42a and the following setting 42b can be easily performed. Further, since the mark 43 which indicates the change of the setting is also displayed at the instruction position where the switching to the screen on which the previous setting 42a is displayed is instructed, this can guide the user to the set position of the previous setting 42a. The printing processing is not continued without noticing the change of the previous setting 42a by the prohibition processing, and wasteful printing processing can be prevented.

Second Embodiment

Next, a print setting control program and a print setting control method according to a second embodiment of the present invention will be described with reference to FIGS. 21 to 24. FIGS. 21 to 24 are diagrams of exemplary print setting screens according to the present embodiment.

In the first embodiment, the marks have been displayed at the set position of the following setting, the set position of the previous setting, and the instruction position where the switching to the screen of the previous setting is instructed. However, when the user can recognize that the setting has been changed by the prohibition processing, other method can be used. In the present embodiment, letters and frames displayed at the set position of the following setting, the set position of the previous setting, and the instruction position where the switching to the screen of the previous setting is instructed are highlighted by thickening, coloring, and blinking them.

For example, in a state where a "finishing" tab is selected on a print setting screen 40 and a finish screen 40b illustrated in FIG. 21 is displayed, "folding" is set to be "Z-folding". After that, as illustrated in FIG. 22, "paper discharge mode" is set to be "face up".

Then, the print setting control program (prohibition determining unit 11d) determines whether the "Z-folding" in previous setting 42a conflicts with the "face up" in following setting 42b. When the settings conflict with each other, a print setting control program (prohibition determining unit 11d) changes the "Z-folding" in the previous setting 42a to "off". Further, a print setting control program (display control unit 11b) highlights the "face up" in the following setting 42b (here, display it with bold letters) and informs that the setting of the other function has been changed of a user. Further, the print setting control program (display control unit 11b) highlights the "off" in the previous setting 42a and informs the change of the setting of the user.

Figure 23:
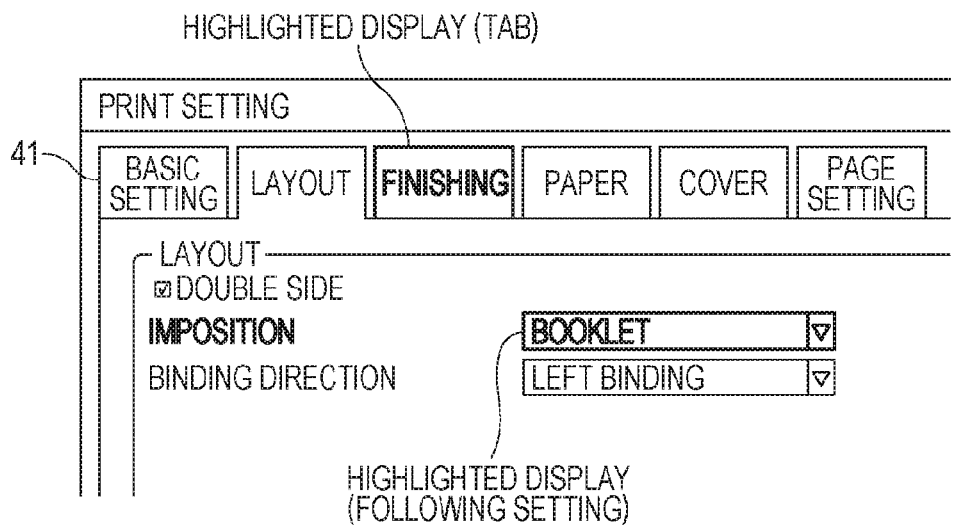
FIG. 23 is a diagram of a part of a layout screen (a state where a booklet is selected) according to the second embodiment of the present invention.

Next, in a state where the "paper discharge mode" in the finish screen 40b is set to be the "face up", a layout screen 40a illustrated in FIG. 23 is displayed, and "imposition" is set to be "booklet".

Figure 24:
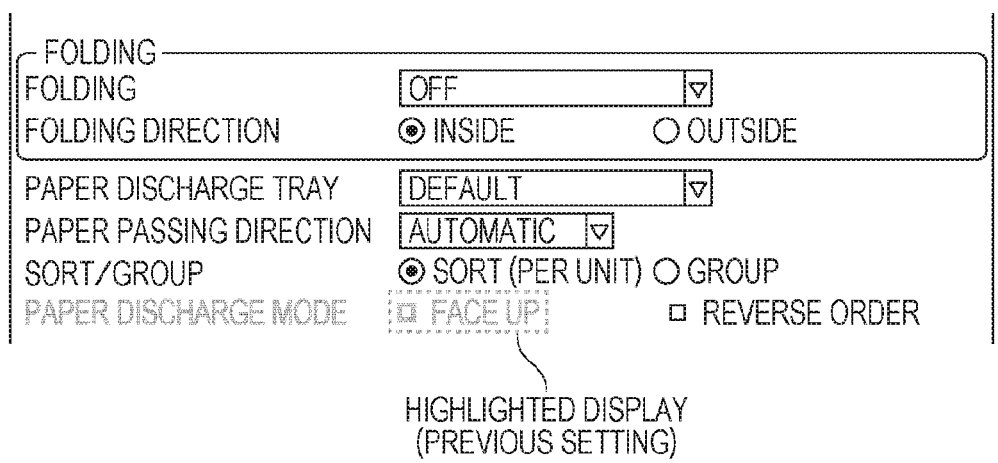
FIG. 24 is a diagram of a part of the finish screen (a state where the face up is changed to be turned off) according to the second embodiment of the present invention.

Then, the print setting control program (prohibition determining unit 11d) determines whether the "face up" in the previous setting 42a conflicts with the "booklet" in the following setting 42b. When the settings conflict with each other, the print setting control program (prohibition determining unit 11d) changes the "face up" in the previous setting 42a to be off. As illustrated in FIG. 23, the print setting control program (display control unit 11b) highlights the "booklet" in the following setting 42b on the layout screen 40a and highlights the instruction position (tab) for instructing to switch the screen to the finish screen 40b where the "paper discharge mode" is displayed. In this way, the print setting control program informs that the other setting has been changed of the user. Further, as illustrated in FIG. 24, the print setting control program (display control unit 11b) highlights the "face up" in the previous setting 42a and informs that the setting has been changed of the user.

FIGS. 21 to 24 are examples. When the change of the setting can be informed of the user, any highlight forms can be used. Further, the highlight of the following setting and the highlight of the previous setting may be the same display form, and the display form of the highlight of the following setting may be changed from that of the previous setting. Further, in FIGS. 21 to 24, an example has been illustrated in which the following setting conflicts with a single previous setting. However, when the following setting conflicts with a plurality of previous settings, it is preferable that the display forms of the respective set positions of the previous settings and the tab be changed from each other.

Further, similarly to the first embodiment, a message 44 indicating a content of the setting change can be displayed according to an operation for moving a cursor closer to the highlighted set position of the following setting, the highlighted set position of the previous setting, and the highlighted tab. Further, the highlighted display may be returned to a normal display after a predetermined period has elapsed and at the time when the prohibition is released.

In this way, since the set position of the previous setting, the set position of the following setting, and the instruction position where the switching to the screen on which the previous setting is displayed is instructed are highlighted, the set position of the previous setting can be easily confirmed, and an operation for resetting the previous setting and the following setting can be easily performed. Further, the user can be guided to the set position of the previous setting, and the printing processing is not continued without noticing the change of the previous setting by the prohibition processing. Further, wasteful printing processing can be prevented.

The present invention is not limited to the embodiments. The structure and control of the present invention can be appropriately changed without departing the scope of the present invention.

For example, in each embodiment, the processing for changing the previous setting due to the conflict between the settings has been described. However, the control according to the present invention can be applied to a case where the setting is automatically changed to a recommended setting. For example, in a case where an option to bind a book is mounted to the printer 30, when the "imposition" in the layout screen is set to be the "booklet", the "folding" in the finish screen is set to be "folding and piling at the center" and "binding direction" is set to be "saddle stitching" to automatically bind a book. Further, in this case, the setting change of the function can be informed of the user by displaying the marks and highlighting the displays.

Further, in each embodiment, the description has been made as using the print setting screen (UI) of the printer driver. However, the print setting control program is not limited to the printer driver. The one which has the UI having the similar function setting to the printer driver may be used. For example, a direct print utility, a job reprinting utility, and a hot folder can be used. Further, the control according to the present invention can be applied to a copier panel for performing job ticket edit.

The present invention can be used for a print setting control program such as a printer driver for performing processing to prohibition and recording media which records the print setting control program, and a print setting control method for using the print setting control program.

Although the present invention has been described and illustrated in detail, it is clearly understood that the same is by way of illustrated and example only and is not to be taken by way of limitation, the scope of the present invention being interpreted by terms of the appended claims.

What is claimed is:

1. A non-transitory recording medium storing a computer readable print setting control program operated by a device for instructing an image forming apparatus to print, the print setting control program causing the device to function as
    an information acquisition unit which obtains information on a function performed by the image forming apparatus,
    a display control unit which causes a display unit to display a print setting screen where the function performed by the image forming apparatus is set based on the information, and
    a prohibition determining unit which determines whether a previous setting which has been previously performed by using the print setting screen conflicts with a following setting performed later and automatically changes the previous setting to a setting which does not conflict with the following setting when the settings conflict with each other, wherein
    the display control unit decorates displays at set positions of the previous setting and the following setting when the previous setting is changed due to the conflict between the settings.

2. The non-transitory recording medium storing a computer readable print setting control program according to claim 1, wherein
    the display control unit displays a first mark, which informs that the settings of a user conflict with each other, near the set position of the previous setting and displays a second mark, which informs that the settings of the user conflict with each other, of the user near the set position of the following setting.

3. A non-transitory recording medium storing a computer readable print setting control program operated by a device for instructing an image forming apparatus to print, the print setting control program causing the device to function as
    an information acquisition unit which obtains information on a function performed by the image forming apparatus,
    a display control unit which causes a display unit to display a print setting screen where the function performed by the image forming apparatus is set based on the information, and
    a prohibition determining unit which determines whether a previous setting which has been previously performed by using the print setting screen conflicts with a following setting performed later and changes the previous setting to a setting which does not conflict with the following setting when the settings conflict with each other, wherein:

the display control unit decorates displays at set positions of the previous setting and the following setting when the previous setting is changed due to the conflict between the settings;

the display control unit displays a first mark, which informs that the settings of a user conflict with each other, near the set position of the previous setting and displays a second mark, which informs that the settings of the user conflict with each other, of the user near the set position of the following setting; and the display control unit displays a third mark near an instruction position where switching from a screen of the following setting to a screen of the previous setting is instructed when the print setting screen includes a plurality of switchable screens and a screen on which the previous setting has been performed is different from a screen on which the following setting has been performed.

4. The non-transitory recording medium storing a computer readable print setting control program according to claim 3, wherein the display control unit displays the first mark and the second mark so that an order of the settings is identified.

5. The non-transitory recording medium storing a computer readable print setting control program according to claim 3, wherein the device functions as an operation control unit for controlling a position of a cursor on the print setting screen, and the display control unit displays a message for informing that the settings conflict with each other of the user corresponding to the mark when the operation control unit has detected that the cursor has been moved closer to any one of first to third marks.

6. The non-transitory recording medium storing a computer readable print setting control program according to claim 5, wherein the display control unit displays information on the conflicting setting as the messages corresponding to the first mark and the second mark.

7. The non-transitory recording medium storing a computer readable print setting control program according to claim 5, wherein the display control unit displays information indicating that there is a setting which has been changed in the screen of the previous setting as the message corresponding to the third mark.

8. A print setting control method for a device for instructing an image forming apparatus to print, comprising performing information obtaining processing for obtaining information on a function performed by the image forming apparatus, display control processing for making a display unit display a print setting screen where the function performed by the image forming apparatus is set based on the information, and prohibition determining processing for determining whether a previous setting which has been previously performed by using the print setting screen conflicts with a following setting performed later and automatically changing the previous setting to a setting which does not conflict with the following setting when the settings conflict with each other, wherein in the display control processing, when the previous setting has been changed due to the conflict between the settings, displays at set positions of the previous setting and the following setting are decorated.

9. The print setting control method according to claim 8, wherein in the display control processing, a first mark, for informing that the settings of a user conflict with each other, is displayed near the set position of the previous setting, and a second mark, for informing that the settings of the user conflict with each other, of the user is displayed near the set position of the following setting.

10. The print setting control method according to claim 9, wherein in the display control processing, when the print setting screen includes a plurality of switchable screens and a screen on which the previous setting has been performed is different from a screen on which the following setting has been performed, a third mark is displayed near an instruction position where switching from a screen of the following setting to a screen of the previous setting is instructed.

11. The print setting control method according to claim 10, wherein in the display control processing, the first mark and the second mark are displayed so that an order of the settings is identified.

12. The print setting control method according to claim 10, further comprising performing operation control processing for controlling a position of a cursor on the print setting screen, wherein in the display control processing, when it has been detected that the cursor has been moved closer to any one of first to third marks according to the operation control processing, a message for informing that the settings conflict with each other of the user is displayed corresponding to the mark.

13. The print setting control method according to claim 12, wherein in the display control processing, information on the conflicting setting is displayed as the messages corresponding to the first mark and the second mark.

14. The print setting control method according to claim 12, wherein in the display control processing, information indicating that there is a setting which has been changed in the screen of the previous setting is displayed as the message corresponding to the third mark.

* * * * *